United States Patent
Ito et al.

[11] Patent Number: 5,892,213
[45] Date of Patent: Apr. 6, 1999

[54] MEMORY CARD

[75] Inventors: Toshiyasu Ito, Togane; Hiroshi Iwasaki, Yokohama; Minoru Ohara, Ome, all of Japan

[73] Assignees: Yamaichi Electronics Co., Ltd., Tokyo; Kabushiki Kaishi Toshiba, Kawasaki, both of Japan

[21] Appl. No.: 71,961

[22] Filed: May 5, 1998

Related U.S. Application Data

[62] Division of Ser. No. 531,391, Sep. 21, 1995.

[51] Int. Cl.⁶ .................................................. G06K 7/06
[52] U.S. Cl. ........................................ 235/441; 235/486
[58] Field of Search ..................... 235/441, 492, 235/487, 486, 475; 361/684, 683; 439/599, 373

[56] References Cited

U.S. PATENT DOCUMENTS

| | | | |
|---|---|---|---|
| 4,264,917 | 4/1981 | Ugon | 357/74 |
| 4,443,048 | 4/1984 | De Pommery et al. | 439/599 |
| 4,449,775 | 5/1984 | de Pommery et al. | 439/373 |
| 4,839,509 | 6/1989 | Yasuma et al. | 235/422 |
| 4,916,662 | 4/1990 | Mizuta | 357/74 |
| 4,931,622 | 6/1990 | Ohtsuki et al. | 235/487 |
| 4,943,464 | 7/1990 | Gloton et al. | 428/76 |
| 5,012,078 | 4/1991 | Pernet | 235/441 |
| 5,033,972 | 7/1991 | Komatsu et al. | 439/153 |
| 5,051,566 | 9/1991 | Pernet | 235/441 |
| 5,152,697 | 10/1992 | Abe et al. | 439/152 |
| 5,153,818 | 10/1992 | Mukougawa et al. | 361/395 |
| 5,184,282 | 2/1993 | Kaneda et al. | 361/395 |
| 5,197,894 | 3/1993 | Koike | 439/159 |
| 5,272,374 | 12/1993 | Kodai et al. | 257/673 |
| 5,286,957 | 2/1994 | DeFrasne | 235/441 |
| 5,296,692 | 3/1994 | Shino | 235/486 |
| 5,297,148 | 3/1994 | Harari et al. | 371/10.2 |
| 5,299,089 | 3/1994 | Lwee | 361/684 |
| 5,334,827 | 8/1994 | Bleier et al. | 235/492 |
| 5,375,037 | 12/1994 | Le Roux | 361/684 |
| 5,469,399 | 11/1995 | Sato et al. | 365/226 |
| 5,508,971 | 4/1996 | Cernea et al. | 365/185.23 |
| 5,514,862 | 5/1996 | Salzano | 235/487 |
| 5,535,328 | 7/1996 | Harari et al. | 395/182.05 |
| 5,550,709 | 8/1996 | Iwasaki | 361/684 |
| 5,563,825 | 10/1996 | Cernea et al. | 365/185.18 |
| 5,568,424 | 10/1996 | Cernea et al. | 365/185.33 |
| 5,572,478 | 11/1996 | Sato et al. | 365/226 |
| 5,592,420 | 1/1997 | Cernea et al. | 365/185.18 |
| 5,596,532 | 1/1997 | Cernea et al. | 365/185.15 |
| 5,602,987 | 2/1997 | Harari et al. | 395/182.06 |
| 5,608,673 | 3/1997 | Rhee | 365/185.33 |
| 5,621,685 | 4/1997 | Cernea et al. | 365/185.18 |
| 5,635,701 | 6/1997 | Gloton | 235/486 |
| 5,638,321 | 6/1997 | Lee et al. | 365/185.17 |
| 5,663,901 | 9/1997 | Wallace et al | 365/52 |
| 5,693,570 | 12/1997 | Cernea et al. | 437/205 |
| 5,739,515 | 4/1998 | Takemura | 235/441 |
| 5,791,474 | 8/1998 | Hansen | 235/486 |

FOREIGN PATENT DOCUMENTS

| | | | |
|---|---|---|---|
| 0 214 478 | 3/1987 | European Pat. Off. | |
| 0105381 | 6/1983 | Japan | 235/486 |
| 403141486A | 6/1991 | Japan | 235/486 |
| 3-194680 | 8/1991 | Japan | |
| 4-16396 | 1/1992 | Japan | |
| 4-205079 | 7/1992 | Japan | |
| 404205079A | 7/1992 | Japan | 235/486 |

*Primary Examiner*—Thien Minh Le
*Attorney, Agent, or Firm*—Wenderoth, Lind & Ponack, L.L.P.

[57] ABSTRACT

A memory card is to be inserted into an electronic device so as to add a memory function. The memory card comprises a parent card and a child card, the child card including a semiconductor memory element and a lead as an external terminal of the memory element. The parent card includes a child card receiving portion and a child card insert port for inserting the child card into the child card receiving portion through the child card insert port, and a contact to be contacted with the lead of the child card within the child card receiving portion. A contact opening/closing slide is provided for causing a contacting portion of the contact to be shifted to a position in which it can contact with the lead while moving in the child card insert direction pushed by the child card. The parent card also includes a connector element for contacting with the electronic device.

12 Claims, 11 Drawing Sheets

MEMORY CARD

This is a Divisional application of Ser. No. 08/531,391, filed Sep. 21, 1995.

BACKGROUND OF THE INVENTION

1. [Field of the Invention]

This invention relates to a memory card to be used for an electronic device such as a computer, a word processor, etc.

2. [Brief Description of the Prior Art]

A memory card is insertable into a receiving port of a personal computer or a word processor for the purpose of adding a required memory function to those electronic devices. To this end, the memory card has specifications prepared in accordance with a standard enabling the memory card to be received in those electronic devices. Memory cards of this type are of a single function and the function which can be added by a single card is limited. For this reason, users must prepare a plurality of memory cards.

Recently, in order to obviate the above inconveniences, there is an attempt to make a so-called card-in-card in which a child card having a memory element can be removably inserted into a parent card which is formed in accordance with a standard. However, realization is still awaited.

SUMMARY OF THE INVENTION

It is, therefore, an object of the present invention to provide a memory card of a so-called card-in-card type capable of extensively increasing the function of an electronic device to which the memory card is applied.

To achieve the above object, there is essentially provided a memory card to be inserted into an electronic device so as to add a memory function, the memory card comprising a parent card and a child card, the child card including a semiconductor memory element and a lead as an external terminal of the memory element. The parent card includes a child card receiving portion and a child card insert port for inserting the child card into the child card receiving portion through the child card insert port, a contact to be contacted with the lead of the child card within the child card receiving portion, and a contact opening/closing slide plate for causing a contacting portion of the contact to be shifted to a position able to contact with the lead while moving in the child card insert direction pushed by the child card, and a connector element for contact with the electronic device.

The contact opening/closing slide plate can serve as a card tray for receiving the child card.

The contact opening/closing slide plate may have a contact guide groove for guiding the contacting portion of the contact when the slide plate moves, and a contacting hole formed in an inner bottom surface of the contact guide groove and adapted to allow insertion and withdrawal of the contacting portion so as to be brought into and out of contact with the lead while the contact opening/closing slide plate is moving.

The parent card may include ejection means for causing a rear end of the child card to be projected outwardly from the child card insert port by moving the contact opening/closing slide plate in a direction opposite to the child card insert direction.

The novel features which are considered characteristic of this invention are set out in the appended claims. The invention itself, however, together with additional objects and advantages thereof will be best understood from the following detailed description taken in conjunction with the accompanying drawings which illustrate, by way of example only, a preferred embodiment of this invention.

DETAILED DESCRIPTION OF THE EMBODIMENTS

One preferred embodiment of the present invention will now be described with reference to the accompanying drawings.

Figure 1A:
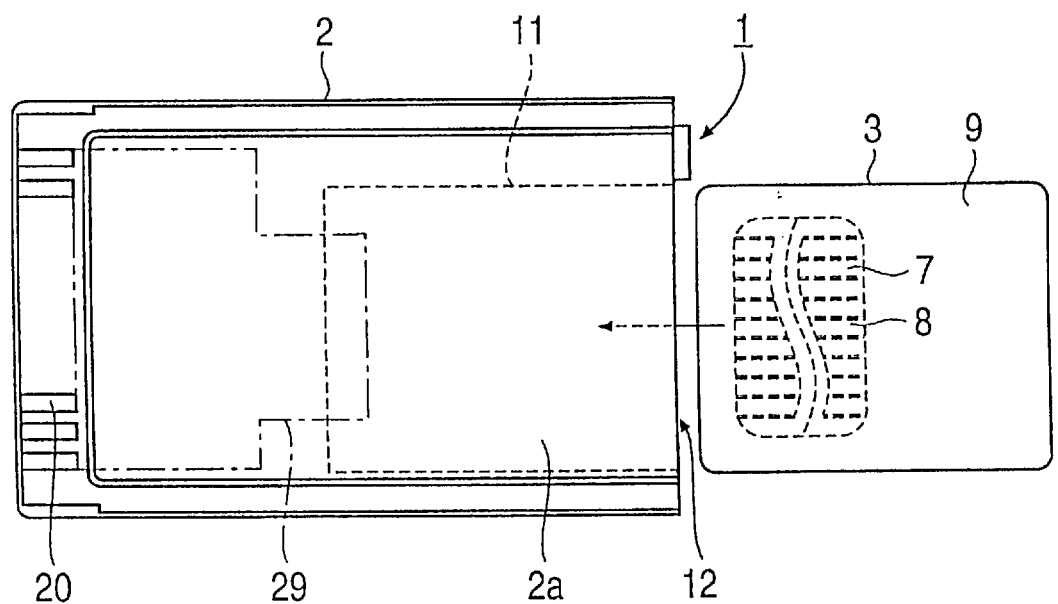
FIG. 1(A) is a plan view of a parent card and a child card.
Figure 1B:
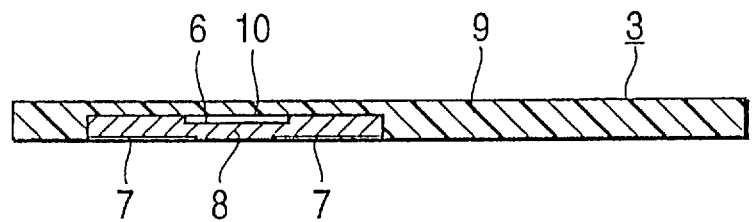
FIG. 1(B) is a sectional view showing a child card on an enlarged scale.
Figure 2:
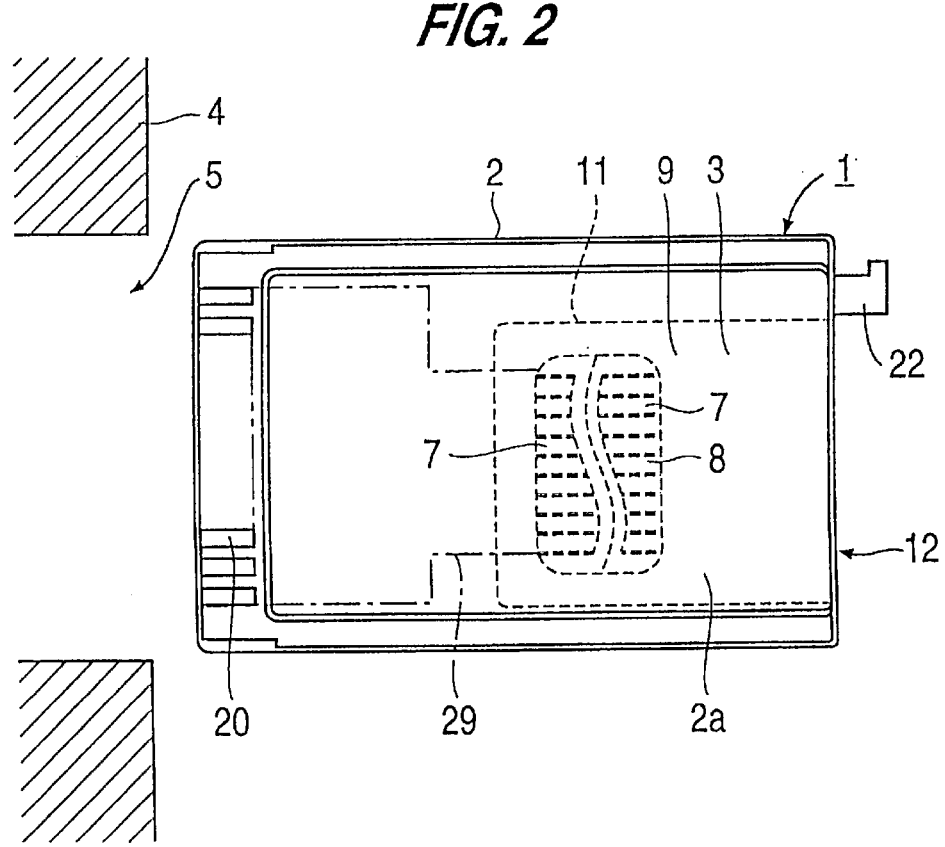
FIG. 2 is a plan view showing the parent card with the child card inserted in the parent card.

Referring first to FIGS. 1 and 2, reference numeral 1 denotes a memory card to be inserted in an electronic device 4 such as a personal computer, a word processor or the like, in order to add a predetermined memory function to the electronic device or change the memory function. This memory card 1 comprises a parent card 2 removably insertable into a receiving port 5 of the electronic device 4, and an exchangeable child card 3 removably insertable into the parent card 2.

As shown in FIG. 1(B), the child card 3 comprises an IC card 8 having an IC chip 6 as a memory element and leads 7 as external terminals thereof, and a base plate 9 to which the IC card 8 is intimately attached. The IC chip 6 and the leads 7 are intimately attached to the upper surface of the IC card 8.

The base plate 9 is an IC chip carrier having an external shape suitable to be inserted into the insert port of the parent card 2. The IC chip 6 is selectively adhered to the base plate 9 by the IC card 8.

A recess 10 is formed in the upper surface of the base plate 9 and the IC card 8 is adhered to an inner bottom surface of the recess 10 so that the IC card 8 does not project from the upper surface of the base plate 9. The foregoing arrangement provides a multiple card construction.

Figure 9:
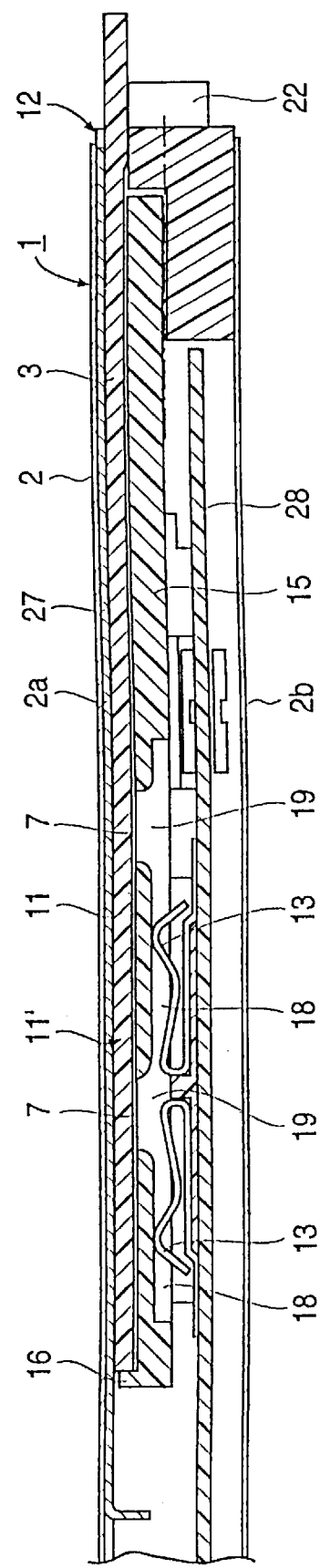
FIG. 9 is a sectional view of a memory card having the parent card with the child card inserted in the parent card, at an early stage of insertion of the child card.
Figure 10:
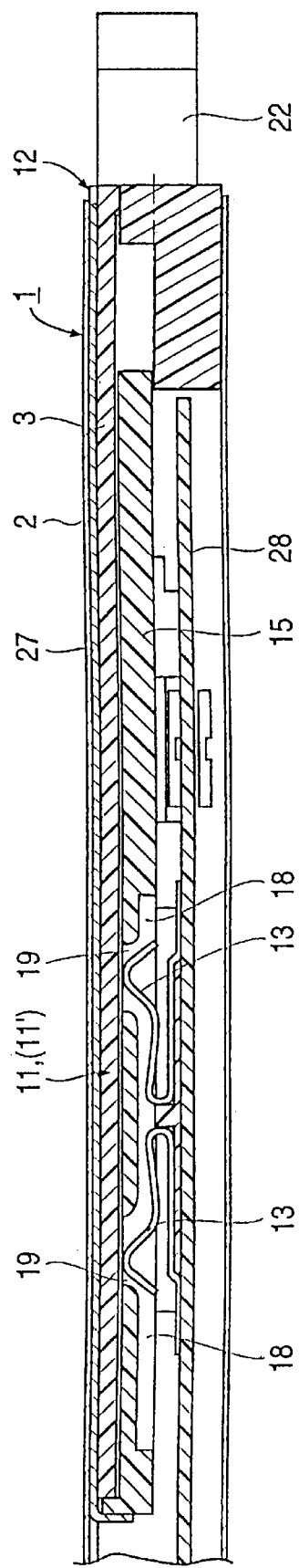
FIG. 10 is a sectional view of the memory card, showing a state in which insertion of the child card into the parent card is finished.

On the other hand, as shown in FIGS. 9 and 10, as well as elsewhere, the parent card 2 has a child card receiving portion 11 for receiving the child card 3. The upper and lower surface plates of the parent card 2 are made of a metal plate, thereby defining shield plates 2a and 2b. The parent card 2 has a child card insert port 12 formed in one end thereof. The child card 3 is removably inserted into the child card receiving portion 11 through the child card insert port 12.

Figure 7:
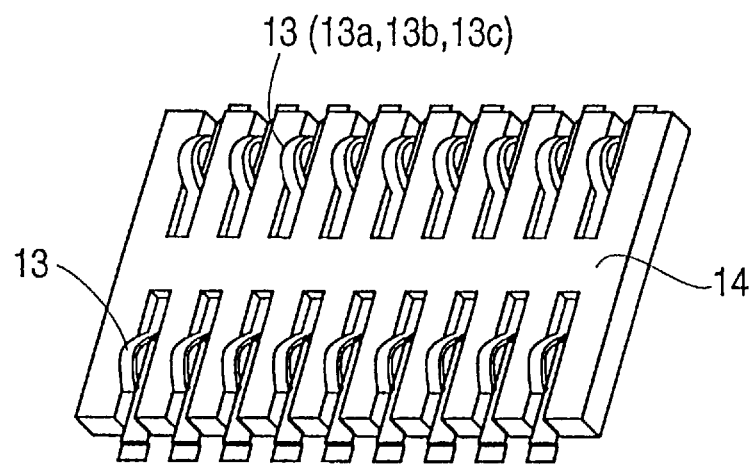
FIG. 7 is a perspective view of a contact holder.

The child card 3 is inserted into the receiving portion 11 formed in the parent card 2 through the child card insert port 12 and brought into electrical contact with contacts 13 disposed in the receiving portion 11. As shown in FIG. 7, the contacts 13 are arranged in array on and held by a flat holder 14. The holder 14 is attached to the upper surface of a wiring board 28 so that the contacts 13 can be connected to a wiring pattern on the wiring board 28. By disposing the contacts 13 in the child card receiving portion 11 of the parent card 2, the contacts 13 can be contained in the parent card 2.

By this, the contacts 13 are arranged in array in a direction perpendicular to the insert direction of the child card 3.

As typically shown in FIG. 11, the contacts 13 comprise grounding contacts 13a, power source contacts 13b, and signal contacts 13c. The contacts 13a, 13b and 13c are restricted by a contact opening/closing slide plate 15 contained in the child card receiving portion 11 of the parent card 2 and sequentially brought into and out of contact with the leads 7 of the child card 3 in predetermined order.

As typically shown in FIG. 9, the contact opening/closing slide plate 15 is contained in the child card receiving portion 11 in the parent card 2 such that the contact opening/closing slide plate 15 can reciprocally move in the insert direction of the child card 3.

Figure 3:
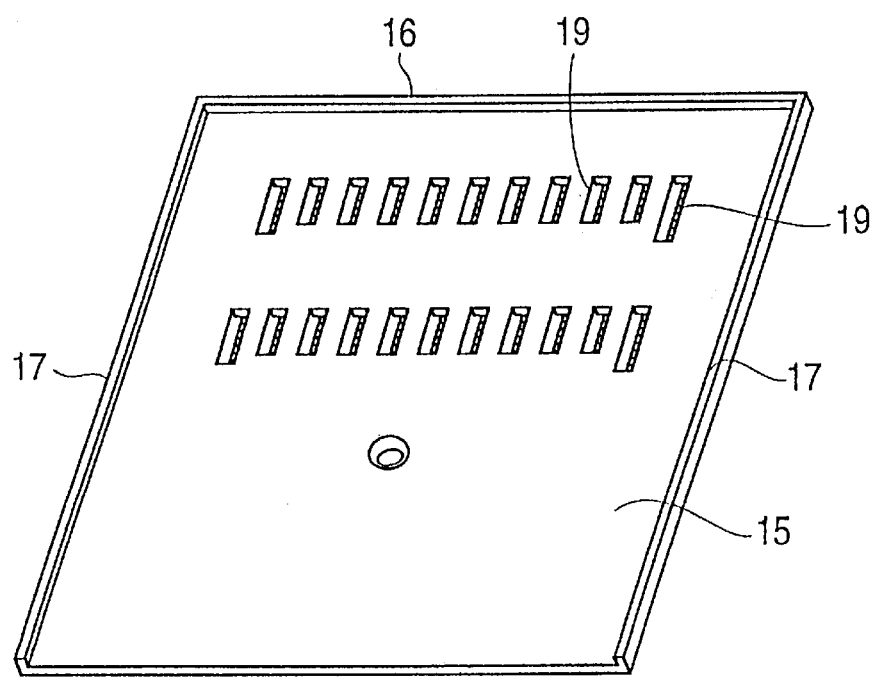
FIG. 3 is a perspective view of an upper surface of a contact opening/closing slide plate.
Figure 4A:
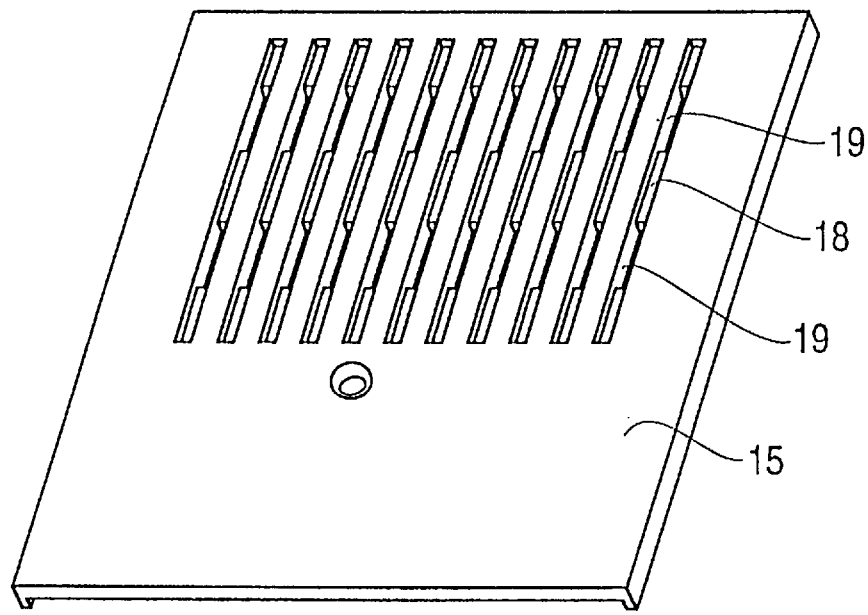
FIG. 4(A) is a perspective view of a lower surface of the slide plate.
Figure 4B:
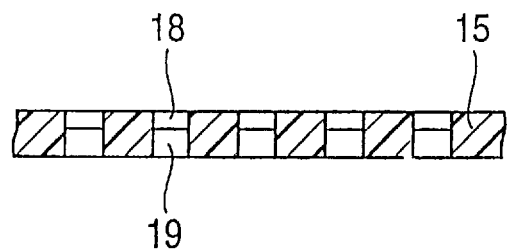
FIG. 4(B) is a sectional view showing a part of the slide plate on an enlarged scale.
Figure 5:
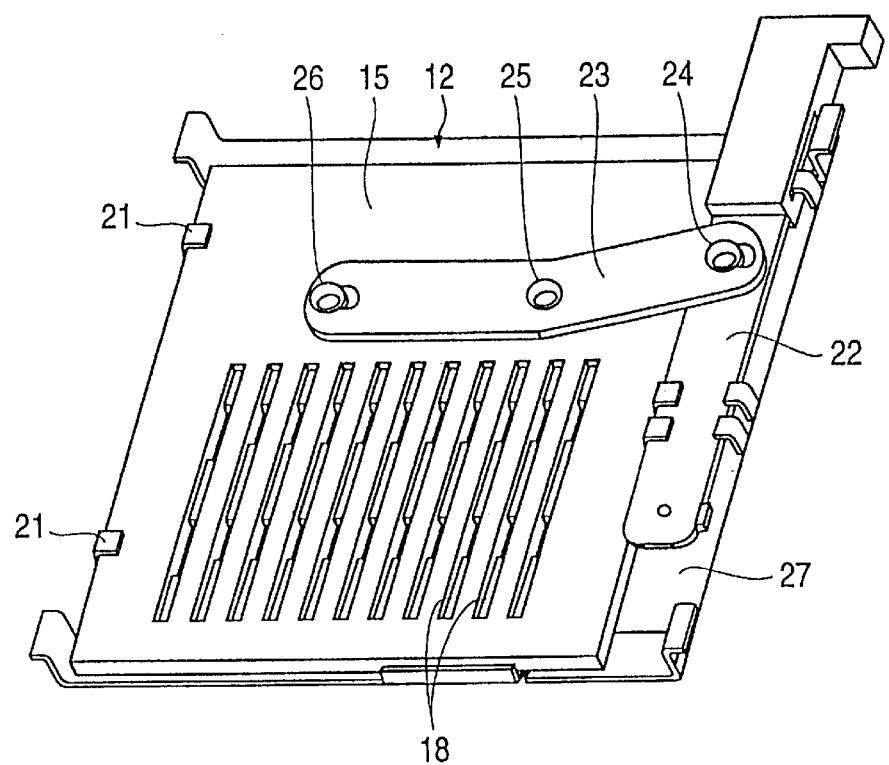
FIG. 5 is a perspective view of a lower surface of an assembly of the slide plate and an eject means.

The contact opening/closing slide plate 15 is pushed by the child card 3 inserted through the child card insert port 12 and caused to move reciprocally in the insert direction of the child card 3. As shown in FIGS. 3 to 5, the contact opening/closing slide plate 15 is provided with a front abutment member 16 which is to be pushed by a front end of the child card 3, and a pair of side rulers 17 for restricting the side surfaces of the child card 3. When the child card 3 is inserted through the child card insert port 12, the left and right side edges of the child card 3 are restricted by the side rulers 17 and the front end of the child card 3 is bought into abutment with the front abutment member 16, thereby correctly positioning the child card 3. The front abutment member 16 is pushed by the front end of the child card 3 so that the contact opening/closing slide plate 15 is caused to move in the insert direction of the child card 3.

In the course of the movement of the contact opening/closing slide plate 15, the contacts 13a, 13b and 13c are sequentially controlled so that they are brought into contact with corresponding leads 7 in a predetermined order.

The contact opening/closing slide plate 15 also serves as a card tray for receiving the child card 3 while restricting the child card 3 with the front abutment member 16 and the side rulers 17. The contact opening/closing slide plate 15 also functions as a means for controlling the opening/closing operation of the contacts 13 in synchronism with insertion of the child card 3.

As shown in FIGS. 3 and 4, as well as elsewhere, the contact opening/closing slide plate 15 is disposed opposite the contacts 13. The contact opening/closing slide plate 15 is also provided at an opposing surface with contact guide grooves 18 for guiding contact portions of the contacts 13. The contact guide grooves 18 are formed in the upper surface of the contact opening/closing slide plate 15, elongated in the insert direction of the child card 3 and arranged in parallel relation at pitches equal to pitches of the contacts. With the contact portions of the contacts 13 resiliently contacted with the inner bottom surfaces of the guide grooves 18, the contact opening/closing slide plate 15 is moved together with the child card 3.

Figure 8:
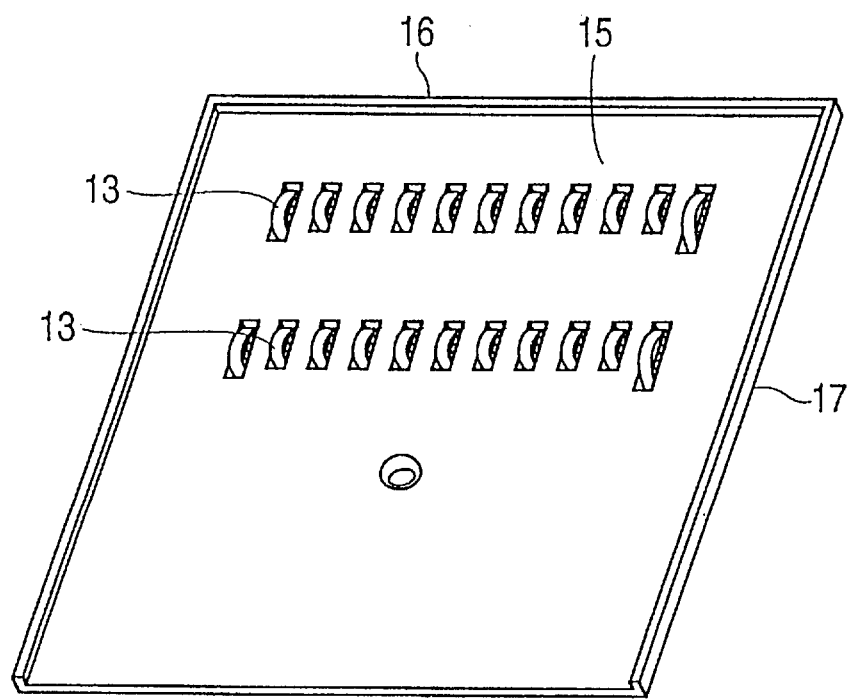
FIG. 8 is a perspective view showing a relation between the slide plate and contacts.

As shown in FIGS. 3 and 8, each contact guide groove 18 is provided at the inner bottom surface thereof with a contact hole 19 through which a corresponding contact 13 appears and disappears during the process of movement of the contact opening/closing slide plate 15.

The contact hole 19 is opened at the inner bottom surface of the contact guide groove 18 and also opened at the lower surface, this lower surface being disposed opposite the upper surface in which the guide grooves 18 are formed, of the contact opening/closing slide plate 15. As typically shown in FIG. 10, the contacts 13 are brought into pressure-contact with corresponding leads 7 of the child card 3 through the contact holes 19.

That is, as shown in FIG. 9, the contact portions of the contacts 13 are received in the contact guide grooves 18 and resiliently contacted with the bottom surfaces of the grooves 18. In that state, when the contact opening/closing slide plate 15 is moved, the contact portions of the contacts 13 are guided by the guide grooves 18. When the contact opening/closing slide plate 15 reaches a predetermined moving position, the contact portions of the contacts 13 are faced with corresponding contact holes 19 and resiliently brought into the contact holes 19 so as to be exposed from the opposite side with respect to the side where the guide grooves 18 are formed and contacted with corresponding leads 7 of the child card 3 under pressure.

As shown in FIGS. 11 to 14, owing to a provision of the contact holes 9, the contacts 13a, 13b, and 13c are sequentially brought into contact with corresponding leads 7 in predetermined order.

Insertion of the child card 3 into the parent card 2 can provide a card-in-card state. The memory card 1 thus constructed is inserted into the receiving port 5 of the electronic device 4 and brought into contact with the electronic device 4 by a connector element 20 disposed on a front end of the parent card 2. The memory function provided to the child card 3 is provided to the electronic device 4 by the parent card 2 through the leads 7 and contacts 13. The connector element 20 is connected to the contacts 13 through the wiring pattern 29 on the wiring board 28.

The parent card 2 contains a means for ejecting the child card 3. This eject means causes the contact opening/closing slide plate 15 to move in the direction opposite to the insertion direction of the child card 3 so that a rear end of the child card 3 projects outwardly from the child card insert port 12 for the purpose of easy removal.

Figure 6:
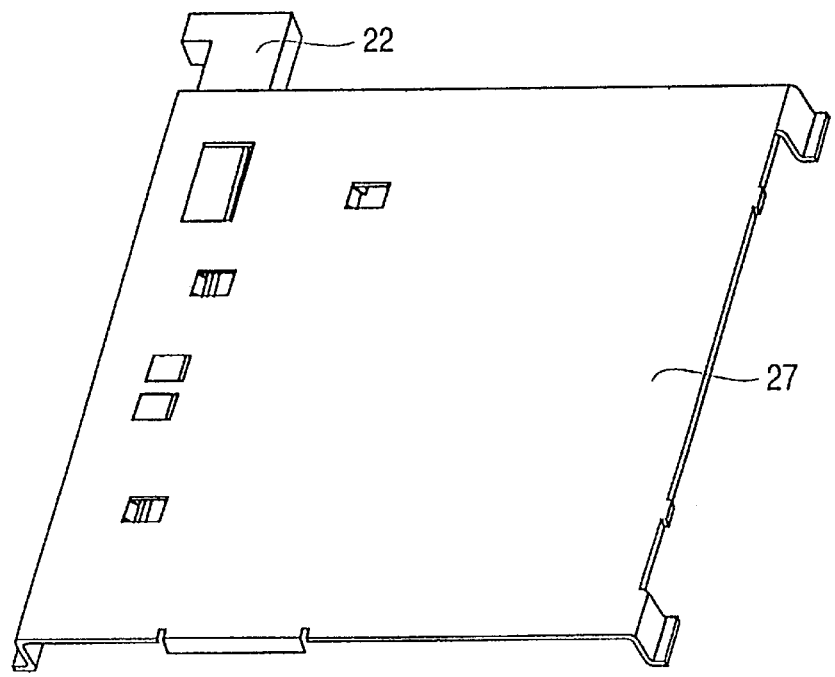
FIG. 6 is a perspective view of an upper surface of the assembly.

For example, FIGS. 5 and 6 show a concrete example of the eject means. As illustrated, the contact opening/closing slide plate 15 is superimposed on the inner surface of a cover 27 integral with the parent card 2, and the front abutment member 16 and side rulers 17 of the slide plate 15 are brought into abutment with the inner surface of the cover 27. By doing this, a child card receiving space 11' is formed between the slide plate 15 and the cover 27. One end of the child card receiving space 11' is open to define the aforementioned child card insert port 12. Guide pieces 21 disposed on the cover 27 are brought into engagement with left and right edge portions of the slide plate 15. As a consequence, the slide plate 15 is held by the cover 27. The slide plate 15 is reciprocally slid while guided by the guide pieces 21 and the inner surface of the cover 27.

On the other hand, an eject lever 22 is disposed adjacent to one side of the slide plate 15. The eject lever 22 and the slide plate 15 are connected by a link 23 so that the eject lever 22 can slide in the insert direction of the child card 3. The arrangement being such that when the eject lever 22 is pushed, the slide plate 15 is moved through the link 23.

For example, one end of the link 23 is pivotally connected to the eject lever 22 and the other end is pivotally connected to the slide plate 15. An intermediate portion of the link 23 is pivotally supported on that surface (lower surface) of the parent card 2 where the cover 27 is not disposed (i.e., the cover 27 is disposed on the upper surface). As a consequence, a pushing force of the eject lever 22 is transmitted to the link 23 through a pivot point 24 and the link 23 is pivoted about a pivot point 25. This pivotally moving force is applied to the pivotal point 26, so that the slide plate 15 is moved. Movement of the slide plate 15 in the direction opposite to the insertion direction of the child card 3 causes the front abutment member 16 to push the child card 3. As a consequence, the rear end of the child card 3 projects outwardly from the insert port 12.

In contrast, when the child card 3 is inserted, the slide plate 15 is moved in the insertion direction of the child card 3. This moving force is applied to the eject lever 22 through the link 23, to thereby push the eject lever 22 into a position where the lever 22 is located before being pushed. In that position, the eject lever 22 waits for the next ejecting operation.

In the manner as mentioned above, the child card 3 can be exchanged.

As described above, the contact opening/closing slide plate 15 co-acts with the child card 3, and further co-acts with the contacts 13, so that the grounding contacts 13a, power source contacts 13b and signal contacts 13c are sequentially operated. This procedure will be described with reference to FIGS. 11 to 14.

Figure 11A:
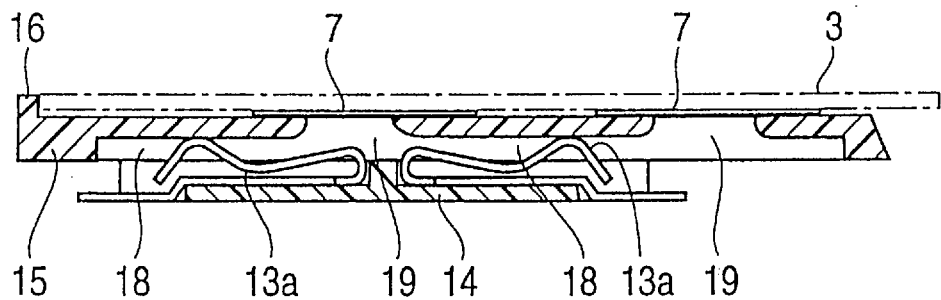
FIGS. 11(A), 11(B) and 11(C) are sectional views showing initial operating states of the contacts for grounding, for a power source and for a signal, and the slide plate.
Figure 11B:
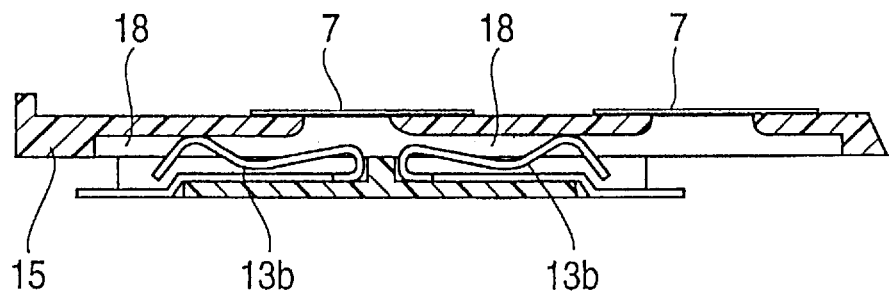
Figure 11C:
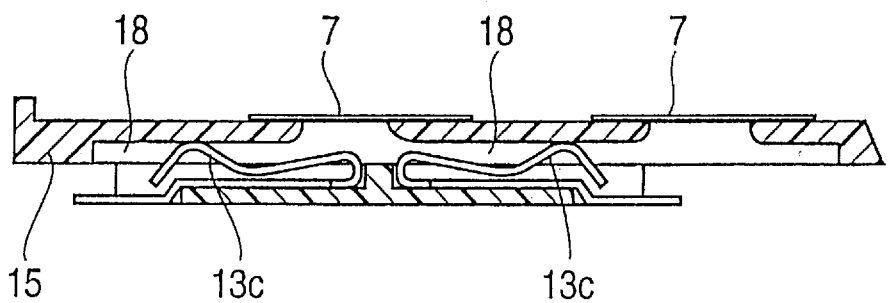

As mentioned above, the contact opening/closing slide plate 15, which also serves as the card tray, is moved in the insertion direction of the child card 3 together with the child card 3 when the child card 3 pushes the front abutment member 16. During the initial process of inserting the child card 3, as shown in FIGS. 11(A), 11(B) and 11(C), any of the contact portions of the grounding contacts 13a, power source contacts 13b and signal contacts 13c are resiliently contacted with the bottom surfaces of the guide grooves 18 and are not in contact with the leads 7.

Figure 12A:
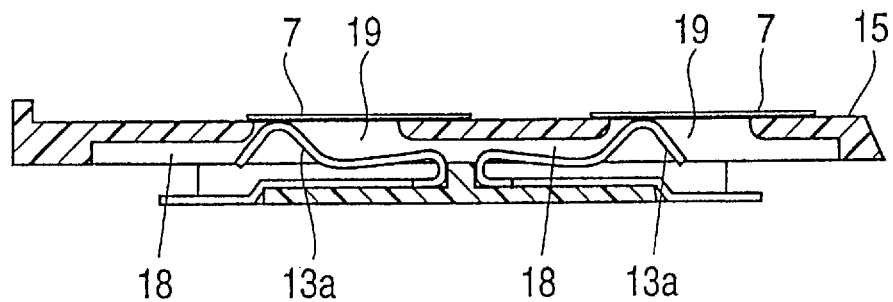
FIGS. 12(A), 12(B) and 12(C) are sectional views showing operating states progressed from FIG. 11.
Figure 12B:
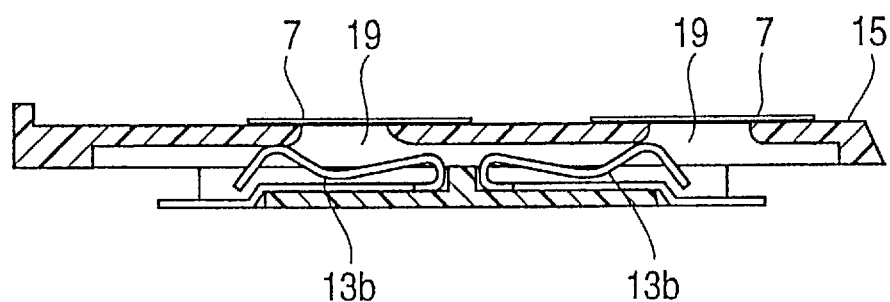
Figure 12C:
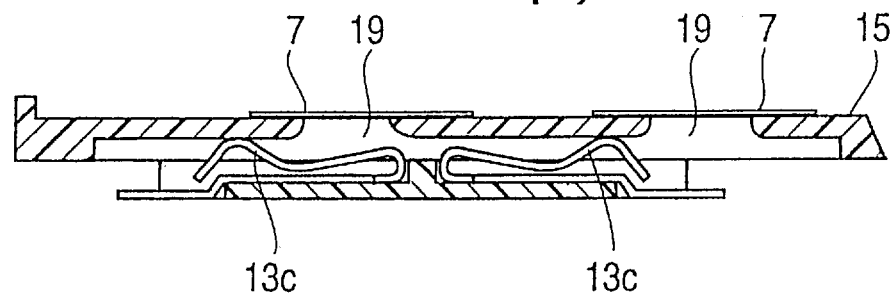

Then, as shown in FIGS. 12(A), 12(B) and 12(C), when the contact opening/closing slide plate 15 is further moved with the progress of insertion of the child card 3, first, as shown in FIG. 12(A), the contact holes 19 are aligned with the contact portions of the grounding contacts 13a. The grounding contacts 13a are brought into the contact holes 19 by their own restoring force, while sliding along the guide grooves 18. As a consequence, the contact portions of the grounding contacts 13a start contacting with the corresponding leads 7 under pressure.

On the other hand, as shown in FIGS. 12(B) and 12(C), the power source contacts 13b and the signal contacts 13c are resiliently contacted with the inner bottom surfaces of the guide grooves 18 in the neighborhood of separate contact holes 19 and are in a non-contact state.

Figure 13A:
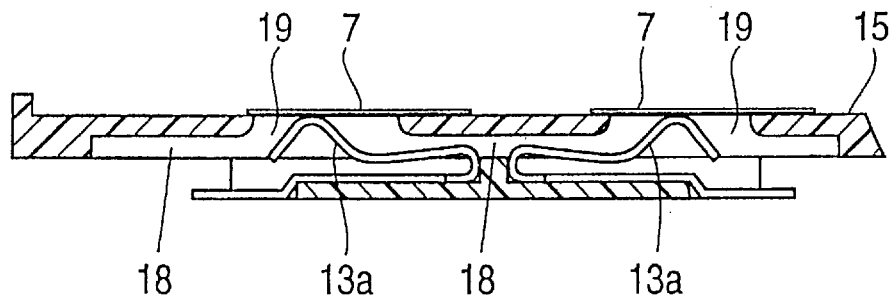
FIGS. 13(A), 13(B) and 13(C) are sectional views showing operating states progressed from FIG. 12.
Figure 13B:
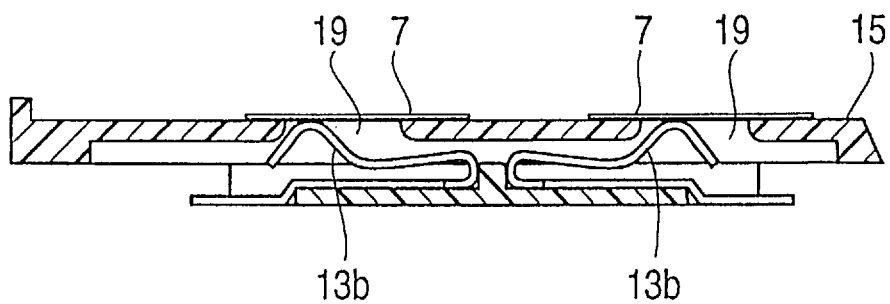
Figure 13C:
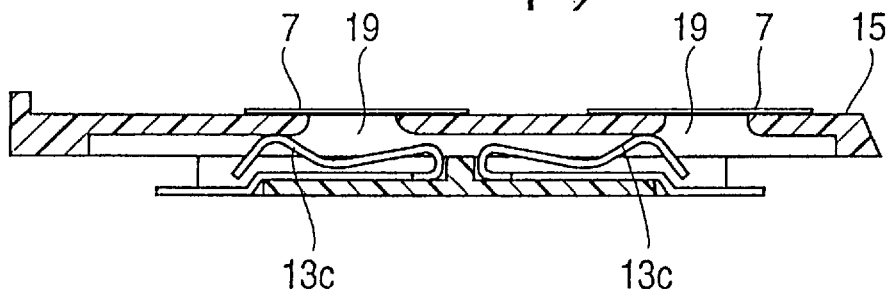

Next, as shown in FIGS. 13(A), 13(B) and 13(C), when the slide plate 15 is further moved with the progress of insertion of the child card 3, as shown in FIG. 13(B), the contact portions of the power source contacts 13b are aligned with the contact holes 19 and the contact portions are resiliently brought into the contact holes 19 so as to be contacted with the power source leads 7 under pressure.

On the other hand, as shown in FIG. 13(A), the grounding contacts 13a are slid on the surfaces of the corresponding leads 7 while maintaining their electrical contact with the grounding leads 7. As shown in FIG. 13(C), the signal contacts 13c are resiliently contacted with the inner bottom surfaces of the guide grooves 18 and are in a non-contact state.

Figure 14A:
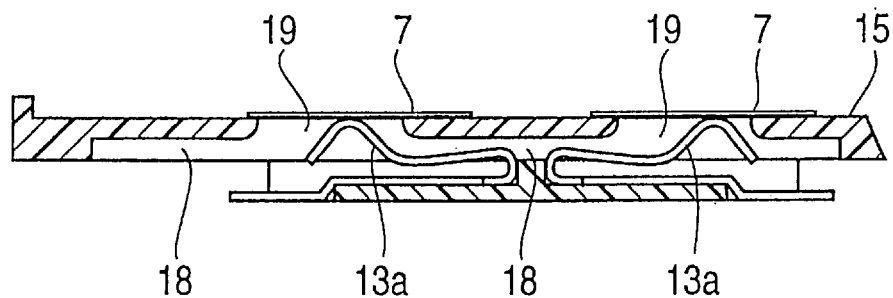
FIGS. 14(A), 14(B) and 14(C) are sectional views showing still further progressed states from FIG. 13.
Figure 14B:
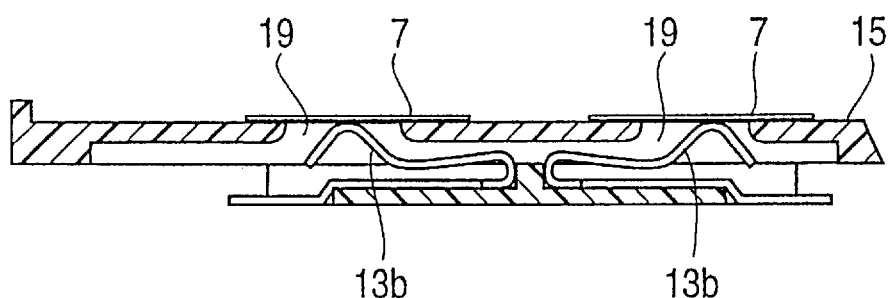
Figure 14C:
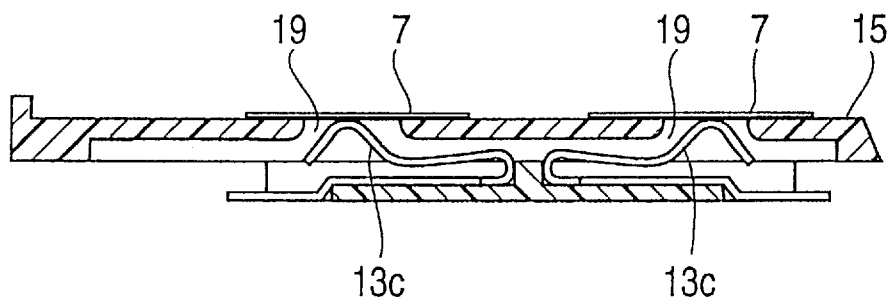

Next, as shown in FIGS. 14(A), 14(B) and 14(C), when the slide plate 15 is further moved with the progress of insertion of the child card 3, as shown in FIG. 14(C), the contact portions of the signal contacts 13c are aligned with the contact holes 19 and the contact portions are resiliently brought into the contact holes 19 so as to be contacted with the signal leads 7 under pressure.

On the other hand, the grounding contacts 13a and power source contacts 13b are slid on the surfaces of the leads 7 while maintaining their electrical contact with the leads 7.

The signal contacts 13c are also slid on the surfaces of the leads 7 and provide the state of FIG. 14(C). Frictional sliding movement of the respective contacts 13a, 13b and 13c along the surfaces of the leads 7 provides a so-called wiping effect. As a consequence, a highly reliable electrical contact can be obtained.

According to the present invention, a child card is removably inserted (such that, the child card is exchangeable) into a parent card, to thereby obtain an electrical connection therebetween. This arrangement of the present invention makes it possible to adequately realize the so-called card-in-card type memory card and enhances its practical use. Accordingly, simply by exchanging one child card with another child card while having a single parent card, the intended purposes for adding/changing the function of an electronic device can effectively be achieved. Thus, the user's requirement of many ways of use of an electronic device is appropriately fulfilled by the present invention.

Although the invention has been described in connection with a preferred embodiment thereof, it will be appreciated that many modifications and variations will readily occur to those skilled in the art without departing from the spirit and scope of the invention.

What is claimed is:

1. A device for use with a card comprising an IC chip and leads, said device comprising:

a contact opening/closing slide plate having a first side comprising a card receiving portion, and a second side having contact guide grooves formed therein along a card insertion direction to respectively receive and guide contact portions of resilient contacts upon sliding of said contact opening/closing slide plate in the card insertion direction relative to the contacts;

wherein a contact hole is formed through to said first side of said contact opening/closing slide plate from an interior of each of said contact guide grooves, such that when the contact portions of the contacts are aligned with said contact holes, respectively, the contact portions of the contacts can respectively resiliently enter said contact holes to thereby respectively contact the leads of the card.

2. A device as recited in claim 1, wherein said contact holes are arranged so that, upon sliding of said contact opening/closing slide plate in the card insertion direction when the card is inserted into said device body in the card insertion direction, the leads of the card are sequentially contacted by the contacts in a predetermined order through said contact holes.

3. A device as recited in claim 1, wherein said contact holes have different lengths along the card insertion direction so that, upon sliding of said contact opening/closing slide plate in the card insertion direction when the card is inserted into said device body in the card insertion direction, the leads of the card are sequentially contacted by the contacts in a predetermined order through said contact holes.

4. A device as recited in claim 1, wherein said contact holes are arranged so that, upon insertion of the card to a predetermined position, the contact portions of the contacts can face and resiliently enter said contact holes be at least partially exposed through said contact holes to an open side of said contacting holes opposite said contact guide grooves.

5. A device for use with a card comprising an IC chip and leads, said device comprising:

a device body having a card receiving part;

a plurality of contacts respectively mounted to said device body to contact the leads of the card when the card is inserted in said device body into a contacting position;

a contact opening/closing slide plate movably mounted to said device body for movement relative to said contacts upon insertion of the card in said device body so as to cause displacement of contact portions of said contacts, respectively;

wherein said contact opening/closing slide plate has contact guide grooves formed therein to respectively receive and guide said contact portions of said contacts upon movement of said contact opening/closing slide plate relative to said contacts; and wherein a contact hole is formed through a surface of said contact opening/closing slide plate from an interior of each of said contact guide grooves, such that when said contact portions of said contacts are aligned with said contact holes, respectively, said contact portions are exposed through said contact holes, respectively, and thereby contact the leads, respectively, of the card when the card is in the contacting position.

6. A device as recited in claim 5, wherein said contacts comprise at least one grounding contact, at least one power source contact and at least one signal contact.

7. A device as recited in claim 6, wherein said contact holes are arranged in said contact opening/closing slide plate so that, upon sliding of said contact opening/closing slide plate in an insertion direction when the card is inserted into said device body in the insertion direction, the leads of the card are respectively sequentially contacted by said at least one grounding contact, then by said at least one power source contact and then by said at least one signal contact.

8. A device as recited in claim 7, wherein said contact holes are further arranged in said contact opening/closing slide plate so that, upon sliding of said contact opening/closing slide plate in a removal direction opposite the insertion direction when the card is being removed from said device body, the leads of the card are all out of contact with said contacts just prior to removal of the card from said device body.

9. A device as recited in claim 5, wherein said contact holes are arranged so that, upon sliding of said contact opening/closing slide plate in the insertion direction when the card is inserted into said device body in the insertion direction, the leads of the card are sequentially contacted by said contacts in a predetermined order through said contact holes.

10. A device as recited in claim 5, wherein said contact holes have different lengths along an insertion direction so that, upon sliding of said contact opening/closing slide plate in the insertion direction when the card is inserted into said device body in the insertion direction, the leads of the card are sequentially contacted by said contacts in a predetermined order through said contact holes.

11. A device as recited in claim 5, wherein said contact holes have different lengths along an insertion direction so that, upon sliding of said contact opening/closing slide plate in the insertion direction when the card is inserted into said device body in the insertion direction, said contacts are contacted against and wiped along the leads in a predetermined order through said contact holes.

12. A device as recited in claim 5, wherein said contact holes are arranged in said contact opening/closing slide plate so that, upon sliding of said contact opening/closing slide plate in an insertion direction when the card is inserted into said device body in the insertion direction, said contacts are contacted against and wiped along the leads in a predetermined order through said contact holes.

\* \* \* \* \*